Oct. 12, 1926.

E. L. BROWNING 1,602,879

POSITIVE SEATING VALVE FOR OIL WELL PUMPS

Filed April 12, 1926

INVENTOR.
EDWIN L. BROWNING.
BY
ATTORNEY.

Patented Oct. 12, 1926.

1,602,879

UNITED STATES PATENT OFFICE.

EDWIN L. BROWNING, OF LONG BEACH, CALIFORNIA.

POSITIVE-SEATING VALVE FOR OIL-WELL PUMPS.

Application filed April 12, 1926. Serial No. 101,329.

In oil wells in which the gas pressure is high, the ball in the traveling valve is held off its seat thus making the pump inoperative. In other wells substances are present which cause the valve to stick on the seat.

An object of my invention is to positively actuate the traveling valve of a pump, such actuation corresponding to the reciprocation of the pump plunger.

Another object is to provide an attachment for oil pumps which will positively actuate the traveling valve.

A feature of my invention consists of a slidable member on the plunger frictionally engaging the sides of the flow tubing, thereby causing said member to move as the plunger is reciprocated.

Other objects of my invention are to provide a positive seating valve which is simple in construction, inexpensive to manufacture and effective in operation.

Other objects, advantages and features of invention may appear from the accompanying drawing, the subjoined detailed description and the appended claims.

In the drawing illustrating my invention,

Figure 1:
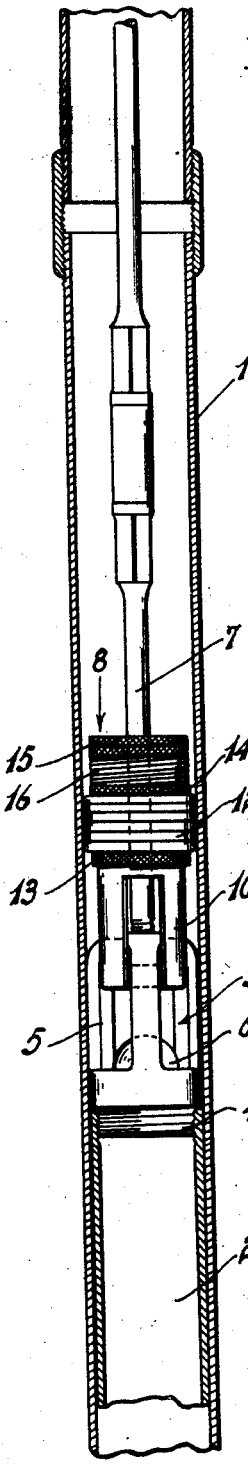
Fig. 1, is a longitudinal sectional view of my valve structure in position on a pump in a well.
Figure 2:
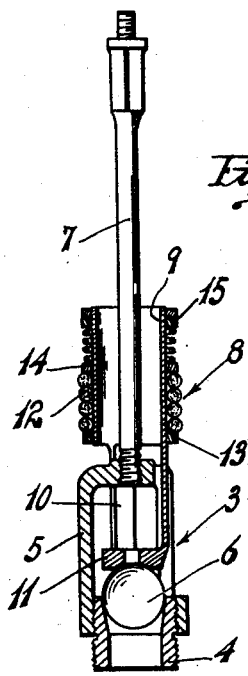
Fig. 2, is a longitudinal sectional view of my invention detached from the pump.
Figure 3:
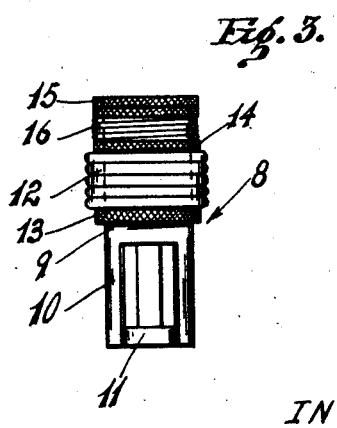
Fig. 3, is a side elevation of the valve actuating member.

Referring more particularly to the drawing, the usual flow tubing 1 which includes the pump barrel extends into the well and the pump plunger 2 of the well known construction is reciprocally mounted therein.

A traveling valve 3 is mounted on the upper end of the plunger 2 by means of a hollow nut 4, secured into said valve and plunger. The valve 3 comprises the usual cage formed with spaced arms 5, and the ball check 6 seated in the nut 4.

The sucker rod 7, by means of which the plunger is reciprocated, is secured to the top of the valve 3.

A valve actuating member 8 is positioned above the valve 3 and consists of a sleeve 9 surrounding the rod 7 and spaced therefrom to permit the passage of oil through said sleeve. Fingers 10 are formed on the lower end of the sleeve 9 which extend between the arms 5 of the valve 3, and a seat or race 11 is secured to the lower end of said fingers, the purpose of which will be further described.

A fibrous packing 12, such as rope, is mounted on the sleeve 9, and is adapted to frictionally engage the walls of the tube 1. A nut 13 is screwed on the sleeve 9 against the bottom of the packing 12, and a ring 14, slidable on said sleeve rests against the top of the packing. An adjusting nut 15 screws on to the top of the sleeve 9 and a coil spring 16 is positioned between said nut and the ring 14, thereby urging said ring against the packing 12 to hold said packing in constant engagement with the tubing 1 irrespective of the wear on said packing.

As the plunger 2 and valve 3 are reciprocated by the rod 7, on the up movement the valve actuating member 8 will remain stationary until the seat 11 engages the ball 6 forcing said ball on to the seat in the nut by reason of the friction of the packing 12 against the walls of the tubing 1. The member 8 will be moved downwardly on the up movement of the plunger 2, and on the down movement of said plunger the member will lag until the seat 11 engages the top of the valve 3 when the member will be drawn downwardly. The seat 11 being away from the ball 6 will allow said ball to rise and permit the passage of oil therearound and through the sleeve 9 into the flow tubing 1. Thus on the up stroke of the plunger the ball 6 is held on its seat by member 8 and a full charge is taken by the plunger, while on the down stroke the ball is free to permit passage of oil.

Having described my invention I claim—

1. In combination with a reciprocating pump, comprising a plunger and a ball check valve thereon, of means frictionally engaging the walls of said pump, and adapted to engage said ball, whereby the ball is positively actuated as the plunger reciprocates.

2. In combination with a reciprocating pump, comprising a plunger and a ball check valve thereon, a valve actuating member comprising a sleeve, means on said sleeve frictionally engaging the walls of said pump, and means on said sleeve adapted to engage said ball, whereby said ball is positively seated or unseated.

3. In combination with a pump comprising a plunger, a valve cage secured to said plunger, a sucker rod secured to said cage and a ball check valve in said cage; of valve actuating means comprising a sleeve positioned above said cage and surrounding said rod, means on said sleeve frictionally engaging the walls of said pump, and means depending from said sleeve and adapted to engage said ball whereby the ball is positively actuated as the plunger reciprocates.

4. In combination with a pump comprising a plunger, a valve cage secured to said plunger, a sucker rod secured to said cage and a ball check valve in said cage; of valve actuating means comprising a sleeve positioned above said cage and surrounding said rod, and being adapted for movement relative to said cage, packing on said sleeve frictionally engaging the walls of said pump, and fingers depending from said sleeve and adapted to engage the ball whereby the ball is positively actuated as the plunger reciprocates.

5. In combination with a pump comprising a plunger, a valve cage secured to said plunger, a sucker rod secured to said cage and a ball check valve in said cage; of valve actuating means comprising a sleeve positioned above said cage and surrounding said rod, and being adapted for movement relative to said cage, packing on said sleeve frictionally engaging the walls of said pump, means urging said packing outwardly against the walls of the pump.

In testimony whereof I affix my signature.

EDWIN L. BROWNING.